(12) United States Patent
Wegener et al.

(10) Patent No.: US 9,481,776 B2
(45) Date of Patent: Nov. 1, 2016

(54) FOAMS OF HIGH THERMAL STABILITY

(75) Inventors: Dirk Wegener, Monheim (DE);
Stephan Reiter, Langenfeld (DE);
Harald Rasselnberg, Dormagen (DE);
Marcel Schornstein, Neuss (DE);
Hans-Detlef Arntz, Lohmar (DE); Dirk Brüning, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 671 days.

(21) Appl. No.: 13/994,212

(22) PCT Filed: Dec. 12, 2011

(86) PCT No.: PCT/EP2011/072481
§ 371 (c)(1),
(2), (4) Date: Aug. 26, 2013

(87) PCT Pub. No.: WO2012/080185
PCT Pub. Date: Jun. 21, 2012

(65) Prior Publication Data
US 2013/0337208 A1 Dec. 19, 2013

(30) Foreign Application Priority Data
Dec. 15, 2010 (DE) ........................ 10 2010 063 104

(51) Int. Cl.
| C08J 9/14 | (2006.01) |
|---|---|
| C08G 18/00 | (2006.01) |
| C08J 9/04 | (2006.01) |
| C08G 18/48 | (2006.01) |
| C08G 18/50 | (2006.01) |
| C08G 18/79 | (2006.01) |
| C08G 18/02 | (2006.01) |
| C08L 101/00 | (2006.01) |
| C08G 101/00 | (2006.01) |

(52) U.S. Cl.
CPC .............. *C08J 9/142* (2013.01); *C08G 18/003* (2013.01); *C08G 18/022* (2013.01); *C08G 18/4825* (2013.01); *C08G 18/5033* (2013.01); *C08G 18/794* (2013.01); *C08J 9/04* (2013.01); *C08G 2101/0008* (2013.01); *C08J 2363/06* (2013.01); *C08L 101/00* (2013.01); *Y10T 428/1376* (2015.01); *Y10T 428/249983* (2015.04)

(58) Field of Classification Search
CPC .............. Y10T 428/1376; Y10T 428/249983; C08J 9/142; C08J 9/04; C08J 2363/06; C08G 18/003; C08G 18/4825; C08G 18/5033; C08G 18/794; C08G 18/022; C08G 2101/0008
See application file for complete search history.

(56) References Cited

U.S. PATENT DOCUMENTS

| 3,001,973 A | 9/1961 | Piepenbrink et al. |
|---|---|---|
| 3,120,502 A | 2/1964 | Merten |
| 3,124,605 A | 3/1964 | Wagner |
| 3,152,162 A | 10/1964 | Fischer et al. |
| 3,201,372 A | 8/1965 | Wagner |
| 3,242,108 A | 3/1966 | McGary et al. |
| 3,277,138 A | 10/1966 | Holtschmidt et al. |
| 3,277,173 A | 10/1966 | Powers et al. |
| 3,362,979 A | 1/1968 | Bentley |
| 3,394,164 A | 7/1968 | McClellan et al. |
| 3,401,190 A | 9/1968 | Schmitt et al. |
| 3,454,606 A | 7/1969 | Brotherton et al. |
| 3,455,883 A | 7/1969 | Kamal et al. |
| 3,492,330 A | 1/1970 | Trecker et al. |
| 3,567,763 A | 3/1971 | Emmons et al. |
| 3,644,457 A | 2/1972 | König et al. |
| 3,676,497 A | 7/1972 | Recchia et al. |
| 3,793,236 A | 2/1974 | Ashida et al. |
| 3,849,349 A | 11/1974 | Frisch et al. |
| 4,129,695 A | 12/1978 | Bonin |
| 4,699,931 A | 10/1987 | Fuzesi et al. |
| 4,788,224 A | 11/1988 | Muller et al. |
| 5,021,536 A | 6/1991 | Muller et al. |
| 5,162,385 A | 11/1992 | Hartwig et al. |
| 5,721,285 A | 2/1998 | Nakamoto et al. |
| 5,770,635 A | 6/1998 | Lee et al. |

FOREIGN PATENT DOCUMENTS

| CA | 2028678 A1 | 5/1991 |
|---|---|---|
| DE | 1072385 B | 12/1959 |
| DE | 1202785 B | 10/1965 |
| DE | 1937685 A1 | 2/1970 |
| DE | 1923214 A1 | 11/1970 |
| DE | 3938062 A1 | 5/1991 |
| DE | 102005041765 A1 | 4/2007 |
| EP | 0272563 A2 | 6/1988 |
| EP | 0296052 A1 | 12/1988 |
| EP | 0331996 A1 | 9/1989 |
| EP | 0476337 A1 | 3/1992 |
| EP | 1435366 A1 | 7/2004 |
| GB | 772830 A | 4/1957 |
| GB | 816923 A | 7/1959 |
| GB | 848671 A | 9/1960 |
| GB | 874430 A | 8/1961 |
| GB | 994890 A | 6/1965 |
| GB | 1017612 A | 1/1966 |
| GB | 1024288 A | 3/1966 |
| GB | 1263439 A | 2/1972 |

OTHER PUBLICATIONS

International Search Report for PCT/EP2011/072481 Mailed Mar. 29, 2012.
International Preliminary Report on Patentability for PCT/EP2011/072481, report dated Jun. 18, 2013.

*Primary Examiner* — Michael C Miggins
(74) *Attorney, Agent, or Firm* — K&L Gates LLP

(57) ABSTRACT

The invention relates to foams of high thermal stability, to the production thereof from organic polyisocyanates and polyepoxides, and to the use of the foams.

11 Claims, No Drawings

FOAMS OF HIGH THERMAL STABILITY

CROSS-REFERENCE TO RELATED APPLICATIONS

This application is a national stage application (under 35 U.S.C. §371) of PCT/EP2011/072481, filed Dec. 12, 2011, which claims benefit of German Application No. 10 2010 063 104.3, filed Dec. 15, 2010, both of which are incorporated herein by reference in their entirety.

The present invention relates to high temperature resistant foams and their production by converting reaction mixtures (=A-state) of organic polyisocyanates and organic polyepoxides by addition of blowing agents and isocyanate-epoxide reaction catalysts into the final foamed infusible C-state and to the use thereof.

The reaction mixtures (=A-state) of organic polyisocyanates and organic polyepoxides can be stabilized with alkylating stoppers, according to the prior art. It is also possible for the organic polyisocyanates to be converted by addition of catalysts and stoppers into an intermediate comprising isocyanurate groups before mixing with the organic polyepoxides. The conversion of organic polyisocyanates into an intermediate comprising isocyanurate groups can also take place after the mixing with the organic polyepoxides. In this case, the high temperature resistant foams are obtained by converting reaction mixtures (=A-state) of organic polyisocyanates, organic polyepoxides, catalysts and stoppers into an intermediate storage-stable higher-viscosity B-state and converting this higher-viscosity B-state by addition of blowing agents and of a spontaneous catalyst for the isocyanate-epoxide reaction into the final foamed infusible C-state.

According to DE 39 38 062 A1, high temperature resistant foams are obtained on converting reaction mixtures (=A-state) of organic polyisocyanates, organic polyepoxides, catalysts and stoppers into an intermediate storage-stable higher-viscosity B-state and converting this higher-viscosity B-state by addition of chemical and/or physical blowing agents and an isocyanate-epoxide reaction catalyst without heating into the final foamed infusible C-state. It is stated to be extremely surprising and as unforeseeable by a person skilled in the art that high temperature resistant foams are obtainable by following this procedure with a wide variety of blowing agents. Water and phosphoric oxide are mentioned as chemical blowing agents and low-boiling inert organic liquids such as pentane, butane, hexane and (hydro)chlorofluorocarbons as physical blowing agents.

According to EP-A-0 272 563, shaped articles are obtainable in two stages by adding latent thermally activatable catalysts to a storage-stable B-state. It is stated to be conceivable for the B-state resins to be combined with blowing agents to produce foams. However, there is no indication as to the form the foaming is supposed to take and which blowing agents are supposed to be used.

EP-A-0 296 052 reveals that high temperature resistant foams are obtainable from mixtures of diisocyanates and bisepoxides in the presence of porous, expanded or dispersed materials. If porous particles are not added, the stated starting mixtures cannot be processed into a foam.

According to EP 0 331 996, storage-stable isocyanate-epoxide mixtures are obtainable. These reactive resin mixtures are useful inter alia for producing electrical insulators, transformers, capacitors or engineering materials. It is stated that when the mixtures are combined with blowing agents it is also be conceivable to produce foams of high dimensional stability at elevated temperatures. But there is no indication as to the foaming conditions and as to which blowing agents are supposed to be used.

U.S. Pat. No. 4,699,931 describes the production of isocyanurate foams comprising oxazolidinone structures by reacting polyisocyanates with polyepoxides in the presence of catalysts, blowing agents and surfactants. Water or halogenated hydrocarbons, for example difluorochloromethane, trichlorofluoromethane, dichlorodifluoromethane, chlorotrifluoromethane, trichlorotrifluoroethane, dichlorofluoroethane, difluorotrichloroethane, tribromochlorofluorobutane and methylene chloride and mixtures thereof are described for producing the foams.

U.S. Pat. No. 3,793,236 discloses isocyanaturate foams comprising oxazolidinone structures and obtained from prepolymers comprising oxazolidinone groups. Blowing agents described as employable for producing foams include inorganic blowing agents, e.g., water and boric acid, hydrocarbons, e.g., pentane, hexane and heptane, halogenated hydrocarbons, e.g., trichlorofluoromethane, and reactive organic blowing agents, e.g., nitroalkanes, aldoximes, acid amides, enolizable carbonyl compounds and nitrourea.

U.S. Pat. No. 3,849,349 describes polyol-modified isocyanurate foams comprising oxazolidinone structures, these foams being obtained, in contrast to the process described in U.S. Pat. No. 3,793,236, by the one-shot process directly from polyisocyanate, polyepoxide and polyol. The blowing agents described correspond to the blowing agents disclosed in U.S. Pat. No. 3,793,236.

U.S. Pat. No. 4,129,695 describes the production of foams from polyisocyanates and polyepoxides, wherein the foams comprise oxazolidinone and carbodiimide groups. The conversion of isocyanate groups into carbodiimide structures releases $CO_2$ which acts as blowing agent. Water, butane, pentane, trifluorochloromethane, dichlorodifluoromethane and chlorofluoroethanes are mentioned as possible additional blowing agents.

According to U.S. Pat. No. 3,242,108, foams are obtainable from polyisocyanates, polyepoxides and components having active hydrogen atoms. The blowing agents described are water and low-boiling solvents, for example benzene, toluene, acetone, ethyl ether, butyl acetate, methylene chloride, carbon tetrachloride, hexane and styrene. Useful blowing agents further include foaming agents which upon heating are decomposed to evolve a gas, examples being ammonium carbonate, sodium bicarbonate, N,N'-dimethyl-N,N'-dinitrosoterephthalamide, para,para'-oxybis (benzenesulfonyl hydrazide), azodicarbonamide, benzenesulfonyl hydrazide, diazoaminobenzene, azodiisobutyronitrile, dinitrosopentamethylenetetramine and para-tert-butylbenzoylazide.

The problem solved by the present invention is that of providing high temperature resistant foams having very good mechanical properties and being obtainable in a simple manner, so they can be industrially fabricated within short mold occupancy times.

As noted in the prior art, blowing agents do not have a marked influence on the quality of the high temperature resistant foams obtained therewith. It is more particularly noted in DE 39 38 062 A1 that the procedure described therein will provide high temperature resistant foam whichever of a very wide variety of blowing agents is used.

It was therefore extremely surprising and unforeseeable that the use of formic acid as blowing agent should provide high temperature resistant foams that are distinctly superior in terms of their mechanical properties to the foams obtained according to the prior art.

Formic acid provides high temperature stable foams having low apparent densities, extremely low brittleness and high compressive strength. This is utterly surprising because formic acid like, for example, water also, when used as a blowing agent, leads to the formation of urea groups which in turn are known to lead to embrittlement of the material. On the other hand, formic acid should by reason of its intrinsic acidic character block the amine catalysts typically used. But, surprisingly, exactly the opposite was found, viz., an optimum ratio for the rates of the foaming and crosslinking reactions.

The invention provides high temperature resistant foams obtainable by reaction of
- a) at least one organic polyisocyanate with
- b) at least one organic compound having at least two epoxide groups, in such an amount as corresponds to an equivalent ratio of 1.2:1 to 500:1 for isocyanate groups to epoxide groups,
- e) optionally in the presence of auxiliary and additive agents, characterized in that the reaction is carried out in the presence of formic acid as blowing agent and optionally further chemical and/or physical blowing agents T) and an isocyanate/epoxide reaction catalyst f).

In a particularly preferred embodiment, the reaction is carried out in the presence
- d) of a stabilizer from the group consisting of organic sulfonic esters, methyl iodide, dimethyl sulfate, benzenesulfonic acid anhydride, benzenesulfonyl chloride, benzenesulfonic acid, trimethylsilyl trifluoromethanesulfonate, the reaction product of benzenesulfonic acid with epoxides and also mixtures thereof.

The invention further provides a process for producing the high temperature resistant foams of the invention by reaction of
- a) at least one organic polyisocyanate with
- b) at least one organic compound having at least two epoxide groups, in such an amount as corresponds to an equivalent ratio of 1.2:1 to 500:1 for isocyanate groups to epoxide groups,
- e) optionally in the presence of auxiliary and additive agents, characterized in that the reaction is carried out in the presence of formic acid as blowing agent and optionally further chemical and/or physical blowing agents T) and an isocyanate/epoxide reaction catalyst f) with foaming.

It is particularly preferable for the process for producing the high temperature resistant foams of the invention to be carried out in such a way that the reaction is carried out in the presence of
- d) a stabilizer from the group consisting of organic sulfonic esters, methyl iodide, dimethyl sulfate, benzenesulfonic acid anhydride, benzenesulfonyl chloride, benzenesulfonic acid, trimethylsilyl trifluoromethanesulfonate, the reaction product of benzenesulfonic acid with epoxides and also mixtures thereof.

In a preferred embodiment, the process for producing the high temperature resistant foams of the invention is carried out by
- (i) reaction of
  - a) at least one organic polyisocyanate in the presence of
  - c) a tertiary amine as catalyst to form an intermediate comprising isocyanurate groups, and
- (ii) discontinuing the reaction under step (i) at a conversion of not more than 60% of the isocyanate groups of isocyanate a) by adding a stabilizer from the group consisting of organic sulfonic esters, methyl iodide, dimethyl sulfate, benzenesulfonic acid anhydride, benzenesulfonyl chloride, benzenesulfonic acid, trimethylsilyl trifluoromethanesulfonate, the reaction product of benzenesulfonic acid with epoxides and also mixtures thereof in an amount d) which is at least equivalent to the amine quantity c), and
- (iii) mixing the product obtained under (ii) with
  - b) at least one organic compound having at least two epoxide groups, in such an amount as corresponds to an equivalent ratio of 1.2:1 to 500:1 for initially used isocyanate groups to epoxide groups,
  - e) optionally in the presence of auxiliary and additive agents, wherein the mixture obtained under (iii) is converted by
(iv) addition of formic acid as blowing agent and optionally further chemical and/or physical blowing agents T) and of an isocyanate-epoxide reaction catalyst f) with foaming into the foamed state.

In a particular embodiment, the process for producing the high temperature resistant foams of the invention is by
- (i) mixing of
  - a) at least one organic polyisocyanate with
  - b) at least one organic compound having at least two epoxide groups, in such an amount as corresponds to an equivalent ratio of 1.2:1 to 500:1 for isocyanate groups to epoxide groups,
- (ii) reacting the mixture by addition of
  - c) a tertiary amine as catalyst to form an intermediate, and
- (iii) discontinuing the reaction at a conversion of not more than 60% of the isocyanate groups of isocyanate a) by adding
  - a stabilizer from the group consisting of organic sulfonic esters, methyl iodide, dimethyl sulfate, benzenesulfonic acid anhydride, benzenesulfonyl chloride, benzenesulfonic acid, trimethylsilyl trifluoromethanesulfonate, the reaction product of benzenesulfonic acid with epoxides and also mixtures thereof in an amount d) which is at least equivalent to the amine quantity c), and so obtaining an intermediate stable B-state of the viscosity range from 1500 to 20 000 mPas at 25° C.,
  - e) optionally in the presence of auxiliary and additive agents, wherein the mixture obtained under (iii)
is converted by addition of formic acid as blowing agent and optionally further chemical and/or physical blowing agents T) and of an isocyanate-epoxide reaction catalyst f) with foaming into the foamed state.

It is particularly preferable to use formic acid as sole blowing agent.

Defoaming into the foamed state may preferably be followed by a subsequent thermal treatment being conducted between 70 and 250° C.

The invention further provides for the use of high temperature resistant foams of the invention, optionally following conditioning, as a filling foam for cavities, as a filling foam for electrical insulation, as a core of sandwich structures, for producing engineering materials for indoor and outdoor applications of any kind, for producing construction materials for vehicle, ship, aircraft and rocket building, for producing aircraft interior and exterior parts, for producing insulating materials of any kind, for producing insulating panels, pipe and container insulations, for producing sound-absorbing materials, for use in engine compartments, for producing abrasive disks and for producing high temperature resistant insulation and low-flammability insulation.

The invention further provides for the use of foamable mixtures before the end of foaming into the high temperature resistant foam of the invention for bonding substrates, for bonding steel and copper sheets, plastics sheets and polybutylene terephthalate sheets.

The invention further provides a cavity, an electrical insulation, a core of a sandwich structure, a sandwich structure, an engineering material for indoor or outdoor applications of any kind, an engineering material for vehicle, ship, aircraft or rocket building, an aircraft interior or exterior part, an insulating material of any kind, an insulating panel, a pipe or container insulation, a sound-absorbing material and insulating or isolating material in an engine compartment, an abrasive disk, a high temperature resistant insulation or a flame retardant insulation, characterized in that it contains or consists of the high temperature resistant foam of the invention.

The invention further provides an adhesive bond to a substrate or an adhesive bond to a steel or copper sheet, to a plastics sheet or to a polybutylene terephthalate sheet, characterized in that it contains or consists of the high temperature resistant foam of the invention.

Isocyanate component a) comprises any organic polyisocyanates of the kind known per se from the field of polyurethane chemistry. Examples of suitable polyisocyanates include aliphatic, cycloaliphatic, araliphatic, aromatic and heterocyclic polyisocyanates of the kind described for example by W. Siefken in Justus Liebigs Annalen der Chemie, 562, pages 75 to 136, for example those of the formula $$Q(NCO)_n,$$

where
  $n=2-4$, preferably 2,
and
  Q is an aliphatic hydrocarbon radical of 2-18, preferably 6-10 carbon atoms, an aromatic hydrocarbon radical 6-15, preferably 6-13 carbon atoms, or an araliphatic hydrocarbon radical of 8-15, preferably 8-13 carbon atoms, e.g., ethylene diisocyanate, 1,4-tetramethylene diisocyanate, 1,6-hexamethylene diisocyanate, 1,12-dodecane diisocyanate, cyclobutane 1,3-diisocyanate, cyclohexane 1,3- and 1,4-diisocyanate and also any desired mixtures thereof, 1-isocyanato-3,3,5-trimethyl-5-isocyanatomethylcyclohexane (DE examined specification 1 202 785, U.S. Pat. No. 3,401,190), 2,4 and 2,6-hexahydrotolylene diisocyanate and also any desired mixtures thereof, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate and also any desired mixtures thereof, diphenylmethane 2,4- and/or 4,4'-diisocyanate, naphthylene 1,5-diisocyanate.

Polyisocyanates useful for the purposes of the present invention further include for example: triphenylmethane 4,4',4''-triisocyanate, polyphenyl polymethylene polyisocyanates as obtained by aniline-formaldehyde condensation and subsequent phosgenation (GB 874 430 and GB 848 671), m- and p-isocyanatophenylsulfonyl isocyanates (U.S. Pat. No. 3,454,606), perchlorinated aryl polyisocyanates (U.S. Pat. No. 3,277,138), polyisocyanates comprising carbodiimide groups (U.S. Pat. No. 3,152,162), norbornane diisocyanates (U.S. Pat. No. 3,492,330), polyisocyanates comprising allophanate groups (GB 994 890), polyisocyanates comprising isocyanurate groups, (U.S. Pat. No. 3,001,973), polyisocyanates comprising urethane groups (U.S. Pat. Nos. 3,394,164 and 3,644,457), polyisocyanates comprising acylated urea groups (DE patent 1 230 778), polyisocyanates comprising biuret groups (U.S. Pat. Nos. 3,124,605, 3,201,372 and 3,124,605), polyisocyanates obtained by telomerization reactions (U.S. Pat. No. 3,654,106), polyisocyanates comprising ester groups (U.S. Pat. No. 3,567,763), reaction products of the abovementioned isocyanates with acetals (DE patent 1 072 385) and polyisocyanates comprising polymeric fatty acid esters (U.S. Pat. No. 3,455,883).

Distillation residues generated in the course of industrial isocyanate production, which comprise isocyanate groups, may also be used, if appropriate as a solution in one or more of the aforementioned polyisocyanates. It is further possible to use any desired mixtures of the aforementioned polyisocyanates.

Preference is generally given to the industrially readily accessible polyisocyanates, for example the 2,4- and 2,6-tolylene diisocyanate and also any desired mixtures thereof ("TDI"), especially polyphenyl polymethylene polyisocyanates as obtained by aniline-formaldehyde condensation and subsequent phosgenation ("crude MDI") and polyisocyanates comprising carbodiimide groups, urethane groups, allophanate groups, isocyanurate groups, urea groups or biuret groups ("modified polyisocyanates"), especially those modified polyisocyanates as are derived from 2,4- and/or 2,6-tolylene diisocyanate or from 4,4'- and/or 2,4'-diphenylmethane diisocyanate.

Particular preference is given to the use of an isomeric and/or homologous mixture of polyisocyanates of the diphenylmethane series having a 2,4'-diisocyanatodiphenylmethane content of more than 20 wt %.

What is concerned here are polyisocyanate mixtures of the diphenylmethane series having a 2,4'-diisocyanatodiphenylmethane content of more than 20 wt % and preferably of 30 to 70 wt %. As well as these 2,4'-isomers, the particularly preferred polyisocyanate component generally contains further isomeric or homologous polyisocyanates of the diphenylmethane series. In other words, the particularly preferred polyisocyanate component generally comprises either mixtures of 2,4'-diisocyanatodiphenylmethane with 4,4'-diisocyanatodiphenylmethane and possibly 0 to 20 wt %, based on the overall mixture, of 2,2'-diisocyanatodiphenylmethane, or else mixtures of these isomers with higher-nuclear polyphenyl polymethylene polyisocyanates. The mixtures mentioned last generally contain from 10 to up to 60 wt %, based on the overall mixture, of such higher-nuclear polyisocyanates. The first-mentioned diisocyanate mixture useful as preferred polyisocyanate component and enriched in 2,4'-isomers is obtainable, for example, by distilling a diisocyanate mixture of the stated composition out of a polyisocyanate mixture formed by phosgenation of aniline-formaldehyde condensates. The mixture containing higher-nuclear polyisocyanates, which is likewise of particularly preferred suitability is obtainable, for example, by backmixing the last-mentioned distillation product with 4,4'-diisocyanatodiphenylmethane-depleted phosgenation product as described in German examined specification DE-AS 1 923 214 for example. It is also possible to obtain a mixture of this type, i.e., a polyisocyanate mixture whose 2,4'-diisocyanatodiphenylmethane content conforms to the particulars provided directly through appropriate control of the aniline-formaldehyde condensation. U.S. Pat. No. 3,277,173, for example, describes a route to polyamine mixtures of the diphenylmethane series having a high 2,4'-diaminodiphenylmethane content. Phosgenation of these 2,4'-diaminodiphenylmethane-rich condensates can then be used to obtain the particularly preferred polyisocyanates directly. Similarly, German laid-open specification DE-OS 1 937 685 and U.S. Pat. No. 3,362,979 point out routes to polyisocyanate mixtures of this type. In the particularly preferred polyisocyanate mixtures, which contain higher-nuclear polyisocyanates of the diphenylmethane series, the 2,4'-diisocyanatodiphenylmethane content is likewise above 20 wt % based on the overall mixture.

Epoxy component b) comprises any desired aliphatic, cycloaliphatic, aromatic or heterocyclic compounds comprising at least two epoxide groups. Preferred epoxides useful as component b) have from 2 to 4, preferably 2 epoxide groups per molecule and an epoxide equivalent weight of 90 to 500 g/eq, preferably 170 to 220 g/eq.

Suitable polyepoxides are for example polyglycidyl ethers of polyhydric phenols, for example of pyrocatechol, resorcinol, hydroquinone, 4,4'-dihydroxydiphenylpropane (bisphenol A), of 4,4'-dihydroxy-3,3'-dimethyldiphenylmethane, of 4,4'-dihydroxydiphenylmethane (bisphenol F), 4,4'-dihydroxydiphenylcyclohexane, of 4,4'-dihydroxy-3,3'-dimethyldiphenylpropane, of 4,4'-dihydroxybiphenyl, from 4,4'-dihydroxydiphenyl sulfone (bisphenol S), of tris(4-hydroxyphenyl)-methane, the chlorination and bromination products of the aforementioned diphenols, of novolacs (i.e., from reaction products of mono- or polyhydric phenols with aldehydes, especially formaldehyde, in the presence of acidic catalysts), of diphenols obtained by esterifying 2 mol of the sodium salt of an aromatic hydroxycarboxylic acid with one mole of a dihaloalkane or of a dihalodialkyl ester (cf. British patent 1 017 612) or of polyphenols obtained by condensation of phenols and long-chain haloparaffins containing at least two halogen atoms (cf. GB patent 1 024 288). There may further be mentioned: polyepoxide compounds based on aromatic amines and epichlorohydrin, e.g., N-di(2,3-epoxypropyl)aniline, N,N'-dimethyl-N,N'-diepoxypropyl-4,4'-diaminodiphenylmethane, N,N-diepoxypropyl-4-aminophenyl glycidyl ether (cf. GB patents 772 830 and 816 923).

Further possibilities are: glycidyl esters of polybasic aromatic, aliphatic and cycloaliphatic carboxylic acids, for example diglycidyl phthalate, diglycidyl isophthalate, diglycidyl terephthalate, diglycidyl adipate and glycidyl esters of reaction products of 1 mol of an aromatic or cycloaliphatic dicarboxylic anhydride and ½ mol of a diol or 1/n mol of a polyol having n hydroxyl groups or diglycidyl hexahydrophthalates, which may optionally be substituted with methyl groups.

Glycidyl ethers of polyhydric alcohols, for example of 1,4-butanediol (Araldite® DY-D, Huntsman), 1,4-butenediol, glycerol, trimethylolpropane (Araldite® DY-T/CH, Huntsman), pentaerythritol and polyethylene glycol can likewise be used. Also of interest are triglycidyl isocyanurate, N,N'-diepoxypropyloxyamide, polyglycidyl thioethers of polyhydric thiols, as for example bismercaptomethylbenzene, diglycidyltrimethylene trisulfone, polyglycidyl ethers based on hydantoins.

It is finally also possible to use epoxidation products of polyunsaturated compounds, such as vegetable oils and conversion products thereof. Epoxidation products of di- and polyolefins, such as butadiene, vinylcyclohexane, 1,5-cyclooctadiene, 1,5,9-cyclododecatriene, chain growth addition polymers and interpolymers which still contain epoxidizable double bonds, for example based on polybutadiene, polyisoprene, butadiene-styrene interpolymers, divinylbenzene, dicyclopentadiene, unsaturated polyesters, also epoxidation products of olefins obtainable via Diels-Alder addition and subsequently converted into polyepoxides by epoxidation with percompound or of compounds containing two cyclopentene or cyclohexene rings linked via bridging atoms or bridging atom groups can likewise be used.

It is also possible to use chain growth addition polymers of unsaturated monoepoxides, for example from glycidyl methacrylate or allyl glycidyl ether.

Preference according to the present invention for use as component b) is given to the following polyepoxide compounds or mixtures thereof:

polyglycidyl ethers of polyhydric phenols, especially of bisphenol A (Ruetapox® 0162, Bakelite AG; Epikote® Resin 162, Hexion Specialty Chemicals GmbH; Eurepox 710, Brenntag GmbH); polyepoxide compounds based on aromatic amines, especially bis(N-epoxypropyl)aniline, N,N'-dimethyl-N,N'-diepoxypropyl-4,4'-diaminodiphenylmethane and N,N-diepoxypropyl-4-aminophenyl glycidyl ether; polyglycidyl esters of cycloaliphatic dicarboxylic acids, especially diglycidyl hexahydrophthalate and polyepoxides from the reaction product of n mols of hexahydrophthalic anhydride and 1 mol of a polyol having n hydroxyl groups (n=integer from 2-6), especially 3 mol of hexahydrophthalic anhydride and one mole of 1,1,1-trimethylolpropane; 3,4-epoxycyclohexylmethyl 3,4-epoxycyclohexanecarboxylate.

Liquid polyepoxides or low-viscosity diepoxides, such as bis(N-epoxypropyl)aniline or vinylcyclohexane diepoxide can in special cases further reduce the viscosity of already liquid polyepoxides or transform solid polyepoxides into liquid mixtures. Component b) is used in an amount which corresponds to an equivalent ratio of 1.2:1 to 500:1, preferably 3:1 to 65:1, especially 3:1 to 30:1, more preferably 3:1 to 10:1 and even more preferably 4:1 to 7:1 for isocyanate groups to epoxide groups.

Catalyst component c) comprises any desired mono- or polyfunctional organic amines having tertiary amino groups. The molecular weight of suitable amines of the type mentioned is generally up to 353, preferably in the range from 101 to 185. Preference is given to such tertiary amines which are liquid at the reaction temperature of the first reaction step. Typical examples of suitable amines are triethylamine, tri-n-butylamine, dimethylcyclohexylamine, N,N,N',N'-tetramethylethylenediamine, N,N-dimethylbenzylamine, triethylenediamine or dimethyloctylamine, N-methylmorpholine or bis(N,N-dimethylaminoethyl) ether, preference being given to N,N-dimethylbenzylamine.

Catalysts c) are used in an amount of 0.01 to 2, preferably 0.01 to 0.1 wt %, based on the overall weight of components a) and b).

Stabilizers d) (also called "stoppers") comprise so-called catalyst poisons for catalysts c). Any desired alkylating esters of organic sulfonic acids are suitable. These alkyl sulfonates preferably have a molecular weight of 110 to 250. Useful alkyl sulfonates include not only aliphatic alkyl sulfonates, such as methyl n-butanesulfonate, methyl n-perfluorobutanesulfonate or ethyl n-hexanesulfonate but also aromatic alkyl sulfonates, such as methyl benzenesulfonate, ethyl benzenesulfonate, n-butyl benzenesulfonate, methyl p-toluenesulfonate, ethyl p-toluenesulfonate, n-butyl p-toluenesulfonate, methyl 1-naphthalenesulfonate, methyl 3-nitrobenzenesulfonate or methyl 2-naphthalenesulfonate. The aromatic sulfonic esters mentioned are preferred. It is particularly preferred to use methyl p-toluenesulfonate as component d). Also suitable but less preferable are methyl iodide and dimethyl sulfate for use as component d), similarly benzenesulfonic anhydride, benzenesulfonyl chloride, benzenesulfonic acid, trimethylsilyl trifluoromethanesulfonate and also the reaction product of benzenesulfonic acid with epoxides, preferably phenoxypropylene oxide.

Component d) is at least used in an amount that is equivalent to the tertiary amine nitrogen atoms of component c).

Useful chemical blowing agents T) include water and/or phospholine oxide as well as formic acid. By way of physical blowing agents T) there are used hydrocarbons such as pentane, butane, hexane, fluorocarbons or hydrofluorocarbons.

In a particularly preferred embodiment, formic acid is the sole blowing agent.

According to the present invention, it is not just the tertiary amines described under c) which are preferable for use as catalyst f) but also any desired mixtures of these recited amines and also, for example, pentamethyldiethylenetriamine, N-methyl-N'-dimethylaminoethylpiperazine, N,N-diethylethanolamine and also silamorpholine.

Suitable amines also include those which have a blowing action as well as the catalytic action. In this case, catalyst component f) also simultaneously acts as blowing agent T.

Preference for use as catalysts f) is given more particularly to dimethylbenzylamine, methyldibenzylamine, boron trichloride/tert-amine adducts and also N-[3-(dimethylamino)propyl]formamide.

Preferred auxiliary and additive agents e) are the known foam stabilizers of the polyether siloxane type, mold release agents, for example polyamide waxes and/or stearic acid derivatives and/or natural waxes, for example carnauba wax.

The optional auxiliary and additive agents e) comprise for example e1) organic compounds of the molecular weight range 62 to 8000, that have at least 2, especially 2 to 8 and preferably 2 to 3 alcoholic hydroxyl groups and are known per se for use as construction component for polyurethane. Examples are simple polyhydric alcohols such as ethylene glycol, 1,6-hexanediol, glycerol or trimethylolpropane, polyols comprising dimethylsiloxane units, e.g. bis(dimethylhydroxymethylsilyl) ether; polyhydroxy compounds having ester groups, for example castor oil or polyhydroxy polyesters of the type obtainable by polycondensation of excess amounts of simple polyhydric alcohols of the type just exemplified with preferably dibasic carboxylic acids or anhydrides such as, for example, acidipic acid, phthalic acid or phtalic anhydride, or polyhydroxyl polyethers of the type obtainable by addition of alkylene oxides such as propylene oxide and/or ethylene oxide onto suitable starter molecules such as, for example, water, the simple alcohols just mentioned or else amines having at least two aminic NH bonds; polyfunctional amines such as, for example, diethyltolylenediamine (DETDA) and polyether polyamines.

Additive agents e1), if used at all, are used in such a maximum amount as corresponds to an NCO/OH equivalent ratio, based on the isocyanate groups of component a) and the hydroxyl groups and/or amino groups of component e1), of at least 2:1, preferably at least 2.5:1. At any rate, the amount of component a) has to be determined such that the equivalent ratio of isocyanate groups of component a) to total epoxy groups of component b), hydroxyl groups and/or amino groups of component e1) and the hydroxyl groups optionally present in component b) is at least 1.2:1, preferably 3:1 to 65:1, especially 3:1 to 30:1, more preferably 3:1 to 10:1 and even more preferably 4:1 to 7:1.

Optional auxiliary and additive agents e) further include e2) polymerizable olefinically unsaturated monomers used in amounts of 100 wt %, preferably up to 50 wt %, especially up to 30 wt %, based on the total weight of components a) and b).

Typical examples of additive agents e2) are olefinically unsaturated monomers having no NCO-reactive hydrogen atoms, for example diisobutylene, styrene, $C_1$-$C_4$-alkylstyrenes, such as α-methylstyrene, α-butylstyrene, vinyl chloride, vinyl acetate, maleimide derivatives such as, for example, bis(4-maleinimidophenyl)methane, $C_1$-$C_8$-alkyl acrylates such as methyl acrylate, butyl acrylate or octyl acrylate, the corresponding methacrylic esters, acrylonitrile or diallyl phthalate. Any desired mixtures of such olefinically unsaturated monomers can likewise be used. Preference is given to using styrene and/or $C_1$-$C_4$-alkyl (meth) acrylates, provided additive agents e2) are used at all.

When additive agents e2) are used, the use of classic polymerization initiators such as benzoyl peroxide for example is possible, but unnecessary.

The use of auxiliary and additive agents e1) and e2) respectively is generally unnecessary. The additive agents exemplified under e1) are incidentally preferable to the compounds exemplified under e2). In principle, it is also possible to use both types of auxiliary and additive agents at one and the same time.

Optional auxiliary and additive agents e) further include for example e3) fillers such as, for example, quartz flour, chalk, microdol, aluminum oxide, silicon carbide, graphite or corundum; pigments such as, for example, titanium dioxide, iron oxide or organic pigments such as phthalocyanine pigments; plasticizers such as, for example, dioctyl phthalate, tributyl phosphate or triphenyl phosphate; incorporable compatibilizers such as methacrylic acid, β-hydroxypropyl esters, maleic and fumaric esters; flame retardancy improvers such as exolith or magnesium oxide; soluble dyes or reinforcing materials such as, for example, glass fibers or glass fabrics. Also suitable are carbon fibers or carbon fiber fabrics and other organic polymeric fibers such as, for example, aramid fibers or liquid crystal (LC) polymer fibers. Useful fillers further include metallic fillers, such as aluminum, copper, iron and/or steel. Metallic fillers are used more particularly in granular and/or pulverulent form.

Optional auxiliary and additive agents e) further include for example e4) olefinically unsaturated monomers having NCO— reactive hydrogen atoms such as, for example, hydroxyethyl methacrylate, hydroxypropyl methacrylate and aminoethyl methacrylate.

The auxiliary and additive agents e) can be not only mixed into the starting materials a) and b) before the process of the present invention, but also mixed in later.

The process of the present invention can be performed by mixing the starting materials a) and b) with each other. The reaction mixture then has added to it any further auxiliary and additive agents e), the catalyst f), formic acid and any further blowing agents T), everything is mixed together intimately and the foamable mixture is poured into an open or closed mold.

When a multicomponent mixing head known from polyurethane processing is used, the process will be notable for high flexibility. The mixing ratio of components a) and b) can be varied to produce different styles of foam from one and the same starting materials. Various components a) and various components b) can additionally be fed directly in different ratios into the mixing head. The auxiliary and additive agents e), the catalyst f), formic acid and optionally further blowing agents T) can be fed into the mixing head separately or as a batch. Another possibility is to meter the auxiliary and additive agents e) together with the catalyst f) and to meter the formic acid and optionally further blowing agents T) separately. The amount of formic acid and optionally further blowing agents T) can be varied to obtain foams having different ranges of apparent density.

In one specific form of the process according to the present invention, a stabilizer d) is added in the course of the mixing of starting materials a) and b) and optionally the auxiliary and additive agents e), or a part thereof, to obtain a reaction mixture that is stable. This stable reaction mixture can be fed into the second step of the process according to the present invention, if desired after intervening storage period of any desired length. For this, the stable reaction mixture has added to it any further auxiliary and additive agents e), the catalyst f), formic acid and any further blowing agents T), everything is mixed together intimately and the foamable mixture is poured into an open or closed mold.

This process is particularly advantageous when the mixing ratio of components a) and b) is not be varied. No separate stock reservoir vessels, metering means and mixing-head feeds for components a) and b) are needed.

In a further advantageous embodiment of the process according to the present invention, the starting materials a) and c) and optionally the auxiliary and additive agents e) or a portion thereof can be mixed with one another and reacted within the temperature range from 20 to 150° C., preferably 60 to 130° C. After a conversion of not more than 60%, preferably from 15 to 30% of the isocyanate groups introduced via component a), the reaction is discontinued by adding the stabilizer/stopper d). The stable intermediate product obtained at this stage can, if desired after an intervening storage period of any desired length, be mixed with the component b) to obtain a room temperature liquid B-state. This room temperature liquid B-state can be fed to the second step of the process according to the present invention, if desired after an intervening storage period of any desired length. For this, the B-state has added to it any further auxiliary and additive agents e), the catalyst f), formic acid and any further blowing agents T), everything is mixed together intimately and the foamable mixture is poured into an open or closed mold.

This process offers the advantage of a higher-viscosity B-state at the start of the foaming reaction. Depending on if, and if yes, which, auxiliary and additive agents e) are added, a higher-viscosity B-state will lead to improved properties on the part of the foam obtained. The subsequent mixing of the stable, partly converted component a) with component b) offers the advantage of high flexibility, since different components b) can be mixed as required with the partly converted component a) to obtain different stable B-states.

In a further advantageous embodiment of the process according to the present invention, the starting materials a) to c) and optionally the auxiliary and additive agents e) or a portion thereof can be mixed with one another and reacted within the temperature range from 20 to 150° C., preferably 60 to 130° C. After a conversion of not more than 60%, preferably from 15 to 30% of the isocyanate groups introduced via component a), the reaction is discontinued by adding the stabilizer/stopper d). The intermediate product obtained at this stage has a room temperature liquid B-state and can, if desired after an intervening storage period of any desired length, be fed to the second step of the process according to the present invention. For this, the intermediate product (B-state) has added to it any further auxiliary and additive agents e), the catalyst f), formic acid and any further blowing agents T), everything is mixed together intimately and the foamable mixture is poured into an open or closed mold.

This process likewise offers the advantage of a higher-viscosity B-state at the start of the foaming reaction. When component b) is not to be varied, this process is preferable in certain cases to the process described hereinbefore. The generally low-viscosity components a) and b) are easy to mix to produce the higher-viscosity B-state therefrom. The partly converted component a), by contrast, can have a comparatively high viscosity depending on its nature and the degree of conversion and this complicates not only the process control in relation to the partial conversion but also the subsequent mixing with component b).

Depending on the components used, the blowing generally starts after a quiescent period of 10 s to 6 min and is generally complete after 2-12 min. The foams are finely cellular and uniform.

For the purpose of achieving optimum properties, it is advantageous for the foaming into the final foamed state to be followed by subsequent thermal treatment.

In one preferred embodiment, the foaming into the foamed state is followed by a subsequent thermal treatment between 70 and 250° C., preferably 120 to 250° C. and more preferably 180 and 220° C.

When a closed mold is used to produce the foams of the present invention (mold foaming), it can be advantageous for the purpose of achieving optimum properties to overpack the mold. Overpack is to be understood as meaning that foamable mixture is introduced in an amount which, in an open mold, and after complete foaming, would occupy a larger volume than the inner volume of the mold.

The foams of the present invention are flame retardant and have low dielectric losses, while the moisture resistance and the abrasion resistance and also the processability in molds are outstanding.

The examples which follow illustrate the invention.

EXAMPLES

Percentages in the examples which follow are all by weight.

Apparent densities were measured on small foam cubes (5×5×5 cm) cut out of the center of the foams.

Compressive strengths were measured as per DIN EN 826 on small foam cubes (5×5×5 cm) cut out of the center of the foams.

Example 1

800 g of a mixture of 60% 2,4'-diisocyanatodiphenylmethane and 40% 4,4'-diisocyanatodiphenylmethane (NCO content=33.6%) were mixed at 50° C. with 200 g of the diglycidyl ether of bisphenol A (epoxide number=0.585) and 0.1 ml of dimethylbenzylamine and then heated up to 120° C. The slightly exothermic reaction indicated the immediate start of isocyanurate formation. After 2 hours' reaction time without external heating, the batch was cooled. This established an internal temperature of about 90° C. A sample was taken from the batch. The sample has an NCO content of 23% NCO. The reaction was discontinued by addition of 1.07 g of methyl p-toluenesulfonate. The batch was subsequently stirred for a further 30 min at 120° C. to produce a 20° C. liquid, clear, yellow storage-stable resin having a viscosity at 25° C. of 2100 mPas and an NCO content of 21% (B-state).

Example 2

100 g of the resin from Example 1 were loaded with air by stirring in a cardboard beaker (diameter: 10 cm, height: 24 cm) with a high-speed stirrer for 2 minutes. With continued stirring, 5 g of polyether polyol (OH number 56 mg KOH/g, F=2, prepared by propoxylation of propylene glycol), 2 g of polyether polysiloxane (Tegostab B 8411, Evonik) and 1 g of N-[3-(dimethylamino)propyl]formamide were added. Directly thereafter, 1.2 g of formic acid (98-100%) were added and the reaction mixture was intimately mixed for a further 10 s. The reaction mixture was allowed to foam up in the cardboard beaker. The foam was conditioned at 200° C. for 4 h.

Apparent density: 50 kg/m$^3$

Comparative Example 3

100 g of the resin from Example 1 were loaded with air by stirring in a cardboard beaker (diameter: 10 cm, height: 24 cm) with a high-speed stirrer for 2 minutes. With continued stirring, 5 g of polyether polyol (OH number 56 mg KOH/g, F=2, prepared by propoxylation of propylene glycol), 2 g of polyether polysiloxane (Tegostab B 8411, Evonik) and 1 g of N-[3-(dimethylamino)propyl]formamide were added. Directly thereafter, 1.0 g of water were added and the reaction mixture was intimately mixed for a further 10 s. The reaction mixture was allowed to foam up in the cardboard beaker. The foam was conditioned at 200° C. for 4 h.

Apparent density: 48 kg/m$^3$

Comparative Example 4

100 g of the resin from Example 1 were loaded with air by stirring in a cardboard beaker (diameter: 10 cm, height: 24 cm) with a high-speed stirrer for 2 minutes. With continued stirring, 5 g of polyether polyol (OH number 56 mg KOH/g, F=2, prepared by propoxylation of propylene glycol), 2 g of polyether polysiloxane (Tegostab B 8411, Evonik) and 1 g of N-[3-(dimethylamino)propyl]formamide were added. Directly thereafter, 10 g of Solkane® 365/227 93/7 (Solvay Fluor GmbH) were added and the reaction mixture was intimately mixed for a further 10 s. The reaction mixture was allowed to foam up in the cardboard beaker. The foam was conditioned at 200° C. for 4 h.

Apparent density: 48 kg/m$^3$

TABLE 1

| | Blowing agent | Apparent density [kg/m$^3$] | Compressive strength [N/mm$^2$] | Cell structure |
|---|---|---|---|---|
| Example 2 | formic acid | 50 | 0.371 | very fine |
| Comparator 3 | water | 48 | 0.282 | fine |
| Comparator 4 | Solkane ® | 48 | 0.293 | fine |

Comparing the compressive strengths at approximately equal apparent densities of the foams demonstrates the enormous advantage of the inventive foam over the prior art water-blown foam and the foam blown with Solkane® 365/227 93/7. The use of physical blowing agents based on fluorinated hydrocarbons, e.g. Solkane® 365/227 93/7, is known from the prior art. The compressive strength of the inventive foam is higher by more than 31% and 26%, respectively.

Example 5

1034.5 g of the resin from Example 1 were loaded with air by stirring in a cardboard beaker (diameter: 10 cm, height: 24 cm) with a high-speed stirrer for 2 minutes. With continued stirring, 14.47 g of polyether polyol (OH number 400 mg KOH/g, F=4, prepared by propoxylation of o-tolylenediamine), 20.7 g of polyether polysiloxane (Tegostab B 8485, Evonik) and 10.33 g of N-[3-(dimethylamino)propyl]formamide were added. Directly thereafter, 2.1 g of formic acid were added and the reaction mixture was intimately mixed for a further 10 s. The reaction mixture was transferred into an open cardboard mold (20×20×14 cm) for foaming. The foam was conditioned at 200° C. for 4 h.

Apparent density: 148 kg/m$^3$

Example 5a

Example 5 was repeated. The polyether polyol (OH number 400 mg KOH/g, F=4, prepared by propoxylation of o-tolylenediamine) was not used. The amount of formic acid used was 1.7 g.

Apparent density: 142 kg/m$^3$

Example 6

1034.5 g of the resin from Example 1 were loaded with air by stirring in a cardboard beaker (diameter: 10 cm, height: 24 cm) with a high-speed stirrer for 2 minutes. With continued stirring, 14.47 g of polyether polyol (OH number 400 mg KOH/g, F=4, prepared by propoxylation of o-tolylenediamine), 20.7 g of polyether polysiloxane (Tegostab B 8485, Evonik) and 10.33 g of N-[3-(dimethylamino)propyl]formamide were added. Directly thereafter, 3.2 g of formic acid were added and the reaction mixture was intimately mixed for a further 10 s. The reaction mixture was transferred into an open cardboard mold (20×20×14 cm) for foaming. The foam was conditioned at 200° C. for 4 h.

Apparent density: 86 kg/m$^3$

Example 6a

Example 6 was repeated. The polyether polyol (OH number 400 mg KOH/g, F=4, prepared by propoxylation of o-tolylenediamine) was not used. The amount of formic acid used was 4.2 g.

Apparent density: 90 kg/m$^3$

Comparative Example 7

Example 5 from DE 39 38 062 A1

200 parts by weight of the resin from Example 1 were intimately mixed with 2 parts by weight of a catalyst mixture A and 1 part by weight of polyether polysiloxane (OS 20 foam stabilizer, Bayer AG) and left to stand at room temperature. After the foam bodies had blown up and become gelled (which took 9 min in total), the apparent density was determined.

Apparent density: 142 kg/m$^3$

Plaques 50×50×10 mm were cut out of the as-obtained foam and conditioned in a heating cabinet for 4 hours at a time at 80° C./120° C./160° C. and 5 hours at 250° C. Compressive strengths at the stated temperatures were subsequently determined on these foam samples.

Compressive strength at 23° C.: 0.90 N/mm$^2$

Catalyst mixture A: mixture of equal parts by weight of pentamethyldiethylenetriamine, N-methyl-N'-dimethylaminoethylpiperazine, N,N-diethylethanolamine and silamorpholine, (also acts as blowing agent T).

TABLE 2

| | Blowing agent | Apparent density [kg/m³] | Compressive strength [N/mm²] | Cell structure |
|---|---|---|---|---|
| Example 5 | formic acid | 148 | 2.38 | very fine |
| Example 5a | formic acid | 142 | 2.22 | very fine |
| Example 6 | formic acid | 86 | 0.91 | very fine |
| Example 6a | formic acid | 90 | 1.02 | very fine |
| Comparator 7 | cat. mix A | 142 | 0.90 | fine |

Comparing the compressive strengths at equal or substantially equal apparent densities for the foams demonstrates the enormous advantage of the inventive foam (Examples 5 and 5a) over the prior art foam (Comparator 7). The compressive strength of the inventive foam is more than 140% and 160% higher, respectively, while apparent density is only minimally higher.

Comparing the apparent densities at similar compressive strengths for the foams likewise demonstrates the enormous advantage of the inventive foam (Examples 6 and 6a) over the prior art foam (Comparator 7). The inventive foam combines an apparent density of 86 kg/m³ or 90 kg/m³ with a compressive strength which the prior art foam only achieves at an apparent density which is higher by 65% and 50%, respectively.

Example 8

100 g of the resin from Example 1 were loaded with air by stirring in a cardboard beaker (diameter: 10 cm, height: 24 cm) with a high-speed stirrer for 2 minutes. With continued stirring, 5 g of polyether polyol (OH number 56 mg KOH/g, F=2, prepared by propoxylation of propylene glycol), 2 g of polyether polysiloxane (Tegostab B 8411, Evonik) and 1 g of N-[3-(dimethylamino)propyl]formamide were added. Directly thereafter, 1.0 g of formic acid were added and the reaction mixture was intimately mixed for a further 10 s. The reaction mixture was allowed to foam up in the cardboard beaker. The foam was conditioned at 200° C. for 4 h.

Apparent density: 60 kg/m³

Compressive strengths were measured at the stated temperatures.

TABLE 3

| Temperature [° C.] | Compressive strength [N/mm²] |
|---|---|
| 23 | 0.44 |
| 70 | 0.41 |
| 130 | 0.40 |
| 180 | 0.34 |
| 220 | 0.31 |

These results show that the process of the present invention provides high temperature stable foams. The foam retains more than 70% of its room temperature compressive strength at 220° C.

The invention claimed is:

1. A high temperature resistant foam obtained by reaction of
    a) at least one organic polyisocyanate with
    b) at least one organic compound having at least two epoxide groups, in such an amount as corresponds to an equivalent ratio of 1.2:1 to 500:1 for isocyanate groups to epoxide groups,
    e) optionally in the presence of auxiliary and additive agents,
    wherein the reaction is carried out in the presence of formic acid as a blowing agent and optionally further chemical and/or physical blowing agents T) and an isocyanate/epoxide reaction catalyst f).

2. The high temperature resistant foam as claimed in claim 1, wherein the reaction is carried out in the presence d) of a stabilizer selected from the group consisting of organic sulfonic esters, methyl iodide, dimethyl sulfate, benzenesulfonic acid anhydride, benzenesulfonyl chloride, benzenesulfonic acid, trimethylsilyl trifluoromethanesulfonate, the reaction product of benzenesulfonic acid with epoxides and mixtures thereof.

3. The high temperature resistant foam as claimed in claim 1, wherein formic acid is used as sole blowing agent.

4. A process for producing the high temperature resistant foam as claimed in claim 1 by
    (i) reaction of
        a) at least one organic polyisocyanate in the presence of
        c) a tertiary amine as catalyst to form an intermediate comprising isocyanurate groups, and
    (ii) discontinuing the reaction under step (i) at a conversion of not more than 60% of the isocyanate groups of isocyanate a) by adding a stabilizer selected from the group consisting of organic sulfonic esters, methyl iodide, dimethyl sulfate, benzenesulfonic acid anhydride, benzenesulfonyl chloride, benzenesulfonic acid, trimethylsilyl trifluoromethanesulfonate, the reaction product of benzenesulfonic acid with epoxides and mixtures thereof in an amount d) which is at least equivalent to the amine quantity c), and
    (iii) mixing the product obtained under (ii) with
        b) at least one organic compound having at least two epoxide groups, in such an amount as corresponds to an equivalent ratio of 1.2:1 to 500:1 for initially used isocyanate groups to epoxide groups,
        e) optionally in the presence of auxiliary and additive agents,
    wherein the mixture obtained under (iii) is converted by
        (iv) addition of formic acid as blowing agent and optionally further chemical and/or physical blowing agents T) and of an isocyanate-epoxide reaction catalyst f) with foaming into the foamed state.

5. A process for producing the high temperature resistant foam as claimed in claim 1 by
    (i) mixing
        a) at least one organic polyisocyanate with
        b) at least one organic compound having at least two epoxide groups, in such an amount as corresponds to an equivalent ratio of 1.2:1 to 500:1 for isocyanate groups to epoxide groups,
    (ii) reacting the mixture by addition of
        c) a tertiary amine as catalyst to form an intermediate, and
    (iii) discontinuing the reaction at a conversion of not more than 60% of the isocyanate groups of isocyanate a) by adding a stabilizer from the group consisting of organic sulfonic esters, methyl iodide, dimethyl sulfate, benzenesulfonic acid anhydride, benzenesulfonyl chloride, benzenesulfonic acid, trimethylsilyl trifluoromethanesulfonate, the reaction product of benzenesulfonic acid with epoxides and also mixtures thereof in an amount d) which is at least equivalent to the amine quantity c), and so obtaining an intermediate stable B-state of the viscosity range from 1500 to 20 000 mPas at 25° C.,
        e) optionally in the presence of auxiliary and additive agents, wherein the mixture obtained under (iii) is converted by addition of formic acid as blowing agent and optionally further chemical and/or physical blowing agents T) and of an isocyanate-epoxide reaction catalyst f) with foaming into the foamed state.

6. An adhesive bond to a substrate or an adhesive bond to a steel or copper sheet, to a plastics sheet or to a polybutylene terephthalate sheet, comprising the high temperature resistant foam as claimed in claim 1.

7. A process for producing the high temperature resistant foam comprising:
reacting
  a) at least one organic polyisocyanate with
  b) at least one organic compound having at least two epoxide groups, in such an amount as corresponds to an equivalent ratio of 1.2:1 to 500:1 for isocyanate groups to epoxide groups,
  e) optionally in the presence of auxiliary and additive agents,
wherein the reaction is carried out in the presence of formic acid as blowing agent and optionally further chemical and/or physical blowing agents T) and an isocyanate/epoxide reaction catalyst f) with foaming into a foamed state.

8. The process as claimed in claim 7, wherein the reaction is carried out in the presence d) of a stabilizer selected from the group consisting of organic sulfonic esters, methyl iodide, dimethyl sulfate, benzenesulfonic acid anhydride, benzenesulfonyl chloride, benzenesulfonic acid, trimethylsilyl trifluoromethanesulfonate, the reaction product of benzenesulfonic acid with epoxides and mixtures thereof.

9. The process as claimed in claim 7, wherein formic acid is used as sole blowing agent.

10. The process as claimed in claim 7, wherein the foaming into the foamed state is followed by a subsequent thermal treatment between 70 and 250° C.

11. A cavity, an electrical insulation, a core of a sandwich structure, a sandwich structure, an engineering material for indoor or outdoor applications of any kind, an engineering material for vehicle, ship, aircraft or rocket building, an aircraft interior or exterior part, an insulating material of any kind, an insulating panel, a pipe or container insulation, a sound-absorbing material and insulating or isolating material in an engine compartment, an abrasive disk, a high-temperature resistant insulation or a flame retardant insulation, comprising the high temperature resistant foam as claimed in claim 1.

* * * * *